E. MEITNER.
RANGE AND BEARING INDICATOR.
APPLICATION FILED SEPT. 5, 1916.

1,392,959.  Patented Oct. 11, 1921.
2 SHEETS—SHEET 1.

INVENTOR
ELEMER MEITNER

BY
Herbert H. Thompson
ATTORNEY.

E. MEITNER.
RANGE AND BEARING INDICATOR.
APPLICATION FILED SEPT. 5, 1916.

1,392,959.

Patented Oct. 11, 1921.

2 SHEETS—SHEET 2.

INVENTOR
ELEMER MEITNER.

BY
Herbert H. Thompson
ATTORNEY.

61.5

UNITED STATES PATENT OFFICE.

ELEMER MEITNER, OF BROOKLYN, NEW YORK, ASSIGNOR, BY MESNE ASSIGNMENTS, TO FORD INSTRUMENT COMPANY, INCORPORATED, OF NEW YORK, N. Y., A CORPORATION OF NEW YORK.

RANGE AND BEARING INDICATOR.

1,392,959.  Specification of Letters Patent.  Patented Oct. 11, 1921.

Application filed September 5, 1916. Serial No. 118,405.

*To all whom it may concern:*

Be it known that I, Dr. ELEMER MEITNER, a subject of the King of Hungary, residing at 95 Lenox road, Brooklyn, in the county of Kings and State of New York, have invented certain new and useful Improvements in Range and Bearing Indicators, of which the following is a specification.

This invention relates to computing and calculating devices for long range gun fire, such as now employed in all branches of ordnance work. It has special reference to naval and coast defense warfare in which it is necessary to fire at a moving target. With the modern long-range guns, and especially in howitzer or high-angle firing, an appreciable time elapses between the firing of the shell and the time when it strikes the target; so that if the target be moving at a fairly high speed, the shell will miss the target if fired at the range and angle indicated at the time of firing. It therefore becomes important that accurate means be provided for calculating this change in range and bearings, due to the moving of the target during this interval. The main object of my invention is to provide a simple device of this character.

Other objects of the invention are to devise means for allowing for deflection of the shell and other disturbances and to devise a means for quickly and accurately indicating the rate of change of range, or rate of change of bearing of the target, or both.

Figure 1:
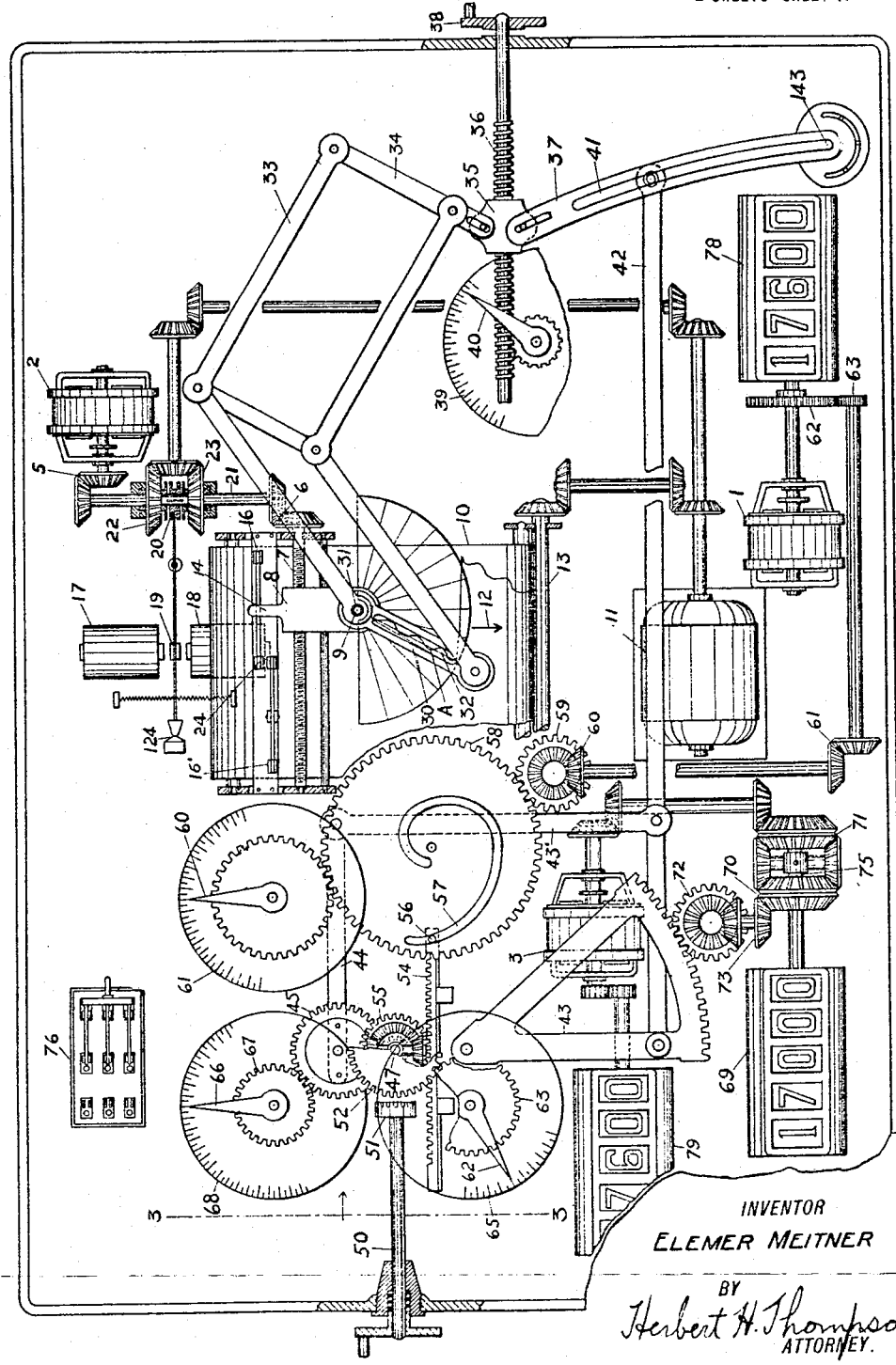
Figure 2:
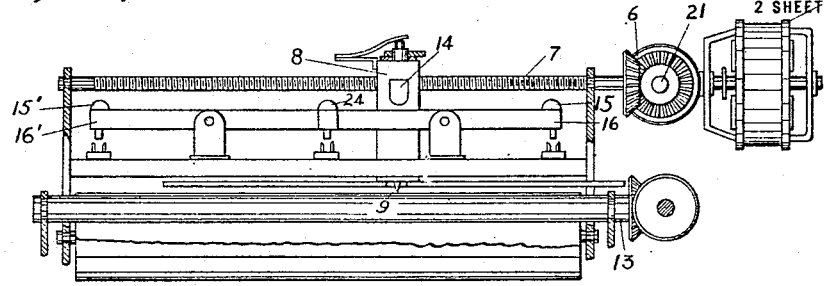
Figure 3:
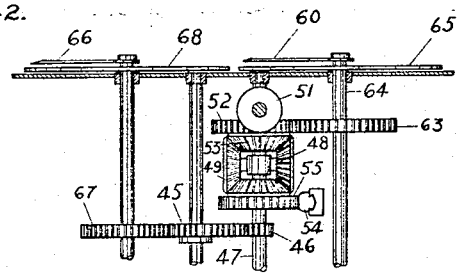
Figure 4:
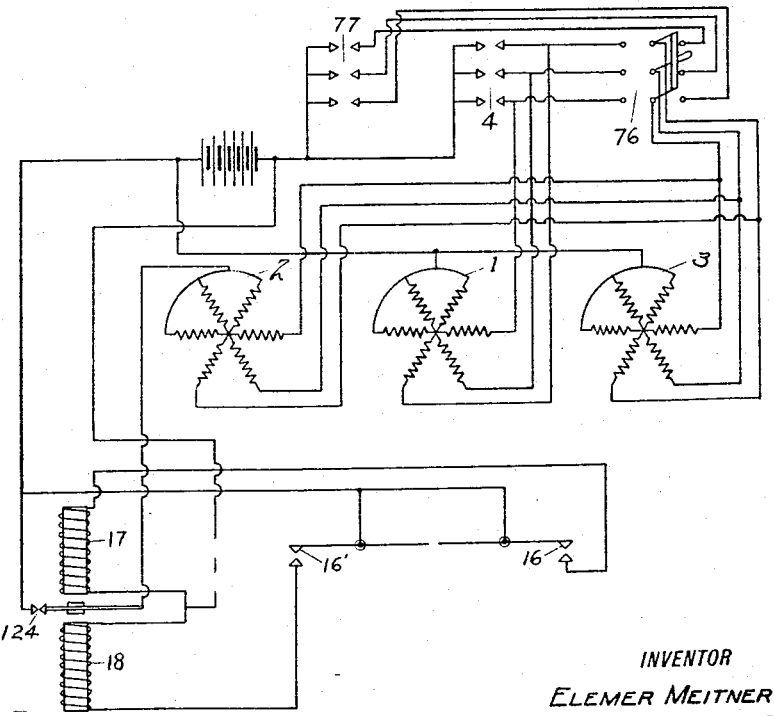

Referring to the drawings in which what I now consider to be the preferred form of my invention is shown, Figure 1 is a plan view in a more or less diagrammatic form, showing an instrument designed in accordance with my invention; Fig. 2 is an end elevation of a portion of the recording mechanism; Fig. 3 is a section on line 3—3, Fig. 1, looking in the direction of the arrow; Fig. 4 is a wiring diagram of the invention.

The apparatus is designed to be used in connection with accurate range finders and target bearing telescopes so that frequent and accurate corrections of the range and bearing will be furnished to the instrument. Preferably, the range finder or target bearing telescope is provided with a transmitter, which is in circuit with repeater motors within the instrument.

As my instrument may be used equally well for indicating either ranges or target bearings, I shall first describe its use as a range-predicting apparatus.

The instrument as shown is provided with a plurality of repeater motors, 1, 2 and 3; all of which are actuated from a transmitter 4 (see Fig. 4) on the range finder or range indicator. The repeater motor 2 is geared by means of pairs of beveled gears 5 and 6 to a shaft 7, on which is threaded a carriage 8, adapted to be moved laterally by rotation of said shaft. Carriage 8 is provided with recording means 9, which traces a line A on a traveling surface 10. Said surface 10 is moved at an angle to the motion of the carriage 8 and preferably at a constant speed, as by means of a motor 11, which causes the paper 10 to travel in the direction of the arrow 12 by means of rollers 13.

As it is very desirable that a continuous record be made of the target's movements, I prefer to provide means whereby the carriage is automatically brought back to a pre-determined position when the pencil 9 approaches the edge of the paper. For this purpose the carriage is provided with a projection 14 adapted to strike knobs 15 or 15' on the pivoted switches 16 or 16' and to depress the same so that an electric circuit is completed through electromagnets 17 or 18. Said magnet, operating upon pivoted armature 19, will throw a clutch member 20 splined upon shaft 21, into engagement with one or other of oppositely rotating beveled gears 22 and 23; so that shaft 21 will be driven rapidly in the proper direction to bring the carriage back to the central position, where it will strike knob 24 and break the said circuit. Gears 22 and 23 may be driven from motor 11, as shown. I do not find it necessary that motor 2 be disconnected from shaft 21 during the resetting operation, as motor 11 is made powerful enough to easily rotate the lighter repeater motor in either direction. But if desired, a throw-out switch 124, operable by said electro-magnets 17 and 18, may be provided, to disconnect or throw out of circuit said repeater motor (Figs. 1 and 4). Switch 16' is substantially a duplicate of switch 16 and is operable when carriage 8 travels toward the left in Fig. 1.

Means are attached to carriage 8, adapted to be set parallel to the general direction of the traced line A. In the embodiment shown, this means consists of a link 30 pivoted at 31 above the tracing means 9 and provided with a fine wire 32, or the like, adapted to be brought into coincidence with the traced line A. For adjusting said link, and at the same time for transmitting the angular position of the link to a more accessible point, I provide a system of parallel linkage 33. The outer member 34 of this linkage which maintains itself parallel to link 30 is secured to a nut 35 threaded upon rotatable stem 36. Also pinned to said nut is a pivoted slotted arm 37. It will be readily seen that the angular position of arm 37 will furnish an indication of the rate of change of range or bearing. A handle 38 may be provided to turn screw 36, and also, if desired, a suitable dial 39 and pointer 40 rotated by said screw may be provided to show the rate of change of range.

Adjustable in a slot 41 of arm 37 is a lever 42 connected at its outer end to a gear segment 43. The position of the lever in the slot toward or away from the center of oscillation 143 of arm 37 is adjusted in accordance with the time taken for the shell to reach the target; also, if desired, in accordance with other corrections which may be applied. To accomplish this end, link 42 is pivoted to a second link 43' which in turn is pivoted to arm 44 pinned to gear wheel 45. Said gear 45 meshes with pinion 46 on shaft 47. Pinned to shaft 47 is rotatable arm 48 of an epicyclic gear train 49. One arm of said train is rotated from a hand-setting device 50 as by means of a crown gear 51 adapted to be brought into mesh with gear 52 secured to bevel gear 53 of the train. The other arm of the train is rotated from a rack bar 54 which meshes with gear 55. Said rack bar is provided with a pin 56 adjacent to one end which works in a specially designed slot 57 in the large gear wheel 58. Said gear wheel is rotated from repeater motor 1, or in other words, from the range indicator or finder, by means of a pinion 59 meshing with said gear 58, a plurality of beveled gears 60—61, and spur gears 62—63.

It will therefore be seen that the position of large gear 58 depends upon the range. Slot 57 is laid out so that a movement will be imparted to the rack bar which is proportional to the time of flight of a shell over a range corresponding to the position of gear 58. It will hence be observed that movement will be imparted to arm 44 which is proportional to the sum of the time of flight and to whatever additional correction may be introduced by means of handle 50, and that lever 42 will be positioned accordingly in slot 41; the result being that a movement is imparted to sector 43 which is proportional to the product of the rate of change of range and the total time correction.

If desired, suitable indicators may be provided to show the time of flight, the introduced correction and the total corrected time. For the purpose of showing the time of flight of the shell, a rotary pointer 60 is geared to gear 58 and is readable upon a dial 61. For showing the correction time, a pointer 62 is driven from gear 52 by means of gear 63 on the stem 64 of said pointer and is readable upon the dial 65. It will be understood that this correction time device may be used for a number of purposes, such as allowing for varying atmospheric conditions and for the time taken for the gunners to fire the guns after the ranges have been sent in. For indicating the total corrected time I provide a pointer 66 driven by means of gear 67 from the gear 45 and readable upon dial 68.

The total corrected range in this embodiment is shown by means of a counter 69 or the like, which is driven by the combined movements of sector 43 above described and by the indicated range. For this purpose sector 43 is connected to one arm 70 of the differential gear train 71 as by means of gear 72 meshing therewith and a plurality of beveled gears 73. Another arm of said train is driven from repeater motor 3 actuated from transmitter 4 on the range finder, the counter 69 being connected with the central arm 75 of said train.

As above stated, my invention may be used either for indicating rate of change of range or rate of change of bearing, depending upon whether the repeater motors are connected with the range finder or target bearing telescope. In order to adapt the instrument for either use, I prefer to provide a double-throw switch 76 which is arranged to connect repeater motors 2 and 3 either to the range indicator transmitter 4 or to the target bearing indicator transmitter 77.

It will be noted that even when instrument is used as a target bearing indicator, repeater motor 1 remains connected to the range finder, since it is necessary that the range be introduced into the machine in order to calculate the time of flight of the shell. When the instrument is used as a range indicator, the counter 78 connected to motor 1 will show present range, while counter 69, as explained, will show the predicted range. When used as a target bearing indicator, counter 78 will still show range, while counter 69 will show the predicted target bearings. A third counter 79 connected to repeater motor 3 may be added to show the present target bearings if desired.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire by Letters Patent is:—

1. In an ordnance calculator, a traveling surface, recording means adapted to move at an angle thereto, means for imparting a uniform movement to one of said parts, means for moving the other of said parts in accordance with changes in a function of the target, a rate of change indicator adapted to be set with respect to the recorded line, a range indicator, means for combining a function of the range with the rate of change and means for combining a time correction with the rate of change, whereby the value of the first named function may be predicted.

2. In an ordnance calculator, a traveling surface, recording means adapted to move at an angle thereto, means for imparting a uniform movement to one of said parts, means for moving the other of said parts in accordance with changes in a function of the target, a rate of change indicator adapted to be set with respect to the recorded line, means for indicating the time of flight of a shell, means for combining the said rate of change with said time and means for adding a time correction to said time of flight.

3. In an ordnance calculator, a traveling surface, recording means adapted to move at an angle thereto, means for imparting a uniform movement to one of said parts, means for moving the other of said parts in accordance with changes in a function of the target, a rate of change indicator adapted to be set with respect to the recorded line, a range indicator, means for computing the time of flight from said range, means for combining said rate of change and said time and means for adding a time correction to said time of flight.

4. In an ordnance calculator, a traveling surface, a recording carriage adapted to move at an angle thereto, means for moving one of said parts in accordance with changes in a function of the target, and automatic means for resetting said carriage.

5. In an ordnance calculator, a traveling surface, a recording carriage adapted to move at an angle thereto, means for moving one of said parts in accordance with changes in a function of the target, and automatic means for resetting said carriage when said carriage approaches the edge of said traveling surface.

6. In an ordnance calculator, a traveling surface, a recording carriage adapted to move at an angle thereto, means for moving one of said parts in accordance with changes in a function of the target, a pivoted member secured to said carriage, means whereby said member may be set parallel to the traced line, and automatic resetting means for said carriage.

7. In an ordnance calculator, a traveling surface, recording means adapted to move at an angle thereto, means for imparting a uniform movement to one of said parts, means for moving the other of said parts in accordance with changes in a function of the target, a rate of change indicator adapted to be set with respect to the recorded line, a settable correction device, and means for combining the setting of said device and the position of the rate of change indicator.

8. In an ordnance calculator, a rate of change indicator showing the change in a function of the target, automatic means for indicating the time of flight of a shell in accordance with the range, a settable time device, and means for combining the said rate of change with said two times.

9. In an ordnance calculator, a traveling surface, a recording carriage adapted to move at an angle thereto, means for moving one of said parts in accordance with changes in a function of the target, a limit switch adapted to be actuated by said carriage, and means brought into action by said switch for reversing the direction of travel of said carriage.

10. In an ordnance calculator, a traveling surface, a constant speed motor for driving the same, a recording carriage adapted to move at an angle thereto, a step by step motor for driving said carriage in accordance with changes in a function of the target, and means responsive to movement of the carriage beyond a predetermined point for causing said first motor to drive said carriage in the opposite direction.

11. In an ordnance calculator, a traveling surface, a constant speed motor for driving the same, a recording carriage adapted to move at an angle thereto, a step by step motor for driving said carriage in accordance with changes in a function of the target, means responsive to movement of the carriage beyond a predetermined point for causing said first motor to drive said carriage in the opposite direction and means for rendering said second motor inoperative during the action of the first motor.

12. In an ordnance calculator, a traveling surface, a recording carriage adapted to move at an angle thereto, means for moving one of said parts in accordance with changes in a function of the target, a limit switch adapted to be actuated by said carriage, means brought into action by said switch for reversing the direction of travel of said carriage and means for throwing out said switch when the carriage reaches its starting position.

13. In an ordnance calculator, a traveling surface, a recording carriage movable at an angle to the direction of travel of said surface, and means controlled by said carriage for reversing the direction of travel thereof when said carriage reaches a limit of travel fixed with reference to distance from the limiting edge of the surface.

14. In an ordnance calculator, means for tracing a line, the angular position of which is indicative of the rate of change of a function of the target, an element adapted to be positioned in accordance with the angular position of said line, a settable correction device and means connected to said element and said device for combining the setting of said device and the position of said element.

15. In an ordnance calculator, a traveling surface, a constant speed motor for driving the same, a recording carriage adapted to move at an angle thereto, means for driving said carriage in accordance with changes in a function of the target, and means responsive to movement of the carriage beyond a predetermined point for causing said motor to drive said carriage in the opposite direction.

16. In an ordnance calculator, a traveling surface, a constant speed motor for driving the same, a recording carriage adapted to move at an angle thereto, means for driving said carriage in accordance with changes in a function of the target, means responsive to movement of the carriage beyond a predetermined point for causing said motor to drive said carriage in the opposite direction, and means for rendering said driving means inoperative during the action of the motor.

In testimony whereof I have affixed my signature.

DR. ELEMER MEITNER.